(12) United States Patent
Laefer et al.

(10) Patent No.: US 7,908,415 B2
(45) Date of Patent: *Mar. 15, 2011

(54) METHOD AND SYSTEM FOR CONTROLLING VIDEO SELECTION AND PLAYBACK IN A PORTABLE MEDIA PLAYER

(75) Inventors: Jay S. Laefer, San Mateo, CA (US); Gregory T. Lydon, Santa Cruz, CA (US); Donald J. Novotney, San Jose, CA (US); John Benjamin Filson, San Jose, CA (US); David Tupman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 12/684,275

(22) Filed: Jan. 8, 2010

(65) Prior Publication Data

US 2010/0106879 A1    Apr. 29, 2010

Related U.S. Application Data

(63) Continuation of application No. 11/519,541, filed on Sep. 11, 2006, now Pat. No. 7,673,083.

(51) Int. Cl.
*G06F 13/42* (2006.01)
*G06F 15/177* (2006.01)
*G06F 13/00* (2006.01)
*G06F 3/00* (2006.01)

(52) U.S. Cl. ........ 710/105; 709/220; 709/230; 709/246; 715/810; 715/747; 725/37; 725/47; 707/104.1; 386/46; 345/169; 345/603

(58) Field of Classification Search ............... 345/169, 345/603; 348/46, 446, 454, 555, 558; 386/45
See application file for complete search history.

(56) References Cited

U.S. PATENT DOCUMENTS

| | | | | |
|---|---|---|---|---|
| 5,051,606 A | * | 9/1991 | Ikehara | 307/134 |
| 5,586,893 A | * | 12/1996 | Mosquera | 439/108 |
| 5,675,467 A | * | 10/1997 | Nishimura et al. | 361/58 |
| 6,012,105 A | * | 1/2000 | Rubbmark et al. | 710/14 |
| 6,031,797 A | * | 2/2000 | Van Ryzin et al. | 369/30.28 |
| 6,236,395 B1 | * | 5/2001 | Sezan et al. | 715/723 |
| 6,429,879 B1 | * | 8/2002 | Sturgeon et al. | 715/723 |
| 6,476,825 B1 | * | 11/2002 | Croy et al. | 715/716 |
| 6,670,997 B1 | * | 12/2003 | Nortrup | 348/558 |
| 6,708,283 B1 | * | 3/2004 | Nelvin et al. | 714/5 |
| 6,776,660 B1 | * | 8/2004 | Kubota et al. | 439/607.17 |
| 6,944,704 B2 | * | 9/2005 | Brelin | 710/305 |
| 7,040,919 B2 | * | 5/2006 | Yao | 439/502 |
| 7,155,545 B1 | * | 12/2006 | Wang | 710/72 |
| 7,281,214 B2 | * | 10/2007 | Fadell | 715/745 |
| 7,293,122 B1 | * | 11/2007 | Schubert et al. | 710/62 |
| 7,299,304 B2 | * | 11/2007 | Saint-Hilaire et al. | 710/11 |
| 7,304,685 B2 | * | 12/2007 | Park et al. | 348/556 |
| 7,305,506 B1 | * | 12/2007 | Lydon et al. | 710/105 |

(Continued)

*Primary Examiner* — Brian T Misiura (74) *Attorney, Agent, or Firm* — Townsend and Townsend and Crew LLP (57) ABSTRACT

A method and system in accordance with the present invention provides a system that allows a portable media player to control settings of portable media player when receiving video from an accessory, to control playback of the portable media player and to provide for navigation between video tracks in a hierarchical fashion. In so doing, a portable media player can then utilize this information to provide for the maximum functionality of the accessory when connected to the portable media player.

26 Claims, 11 Drawing Sheets

U.S. PATENT DOCUMENTS

| | | | |
|---|---|---|---|
| 7,391,963 B2* | 6/2008 | Chen et al. | 386/125 |
| 7,634,605 B2* | 12/2009 | Laefer et al. | 710/303 |
| 7,673,083 B2* | 3/2010 | Laefer et al. | 710/105 |
| 2002/0108108 A1* | 8/2002 | Akaiwa et al. | 725/30 |
| 2003/0004934 A1* | 1/2003 | Qian | 707/3 |
| 2003/0073432 A1* | 4/2003 | Meade, II | 455/420 |
| 2003/0167318 A1* | 9/2003 | Robbin et al. | 709/221 |
| 2004/0224638 A1* | 11/2004 | Fadell et al. | 455/66.1 |
| 2004/0252966 A1* | 12/2004 | Holloway et al. | 386/46 |
| 2005/0018768 A1* | 1/2005 | Mabey et al. | 375/240.2 |
| 2005/0149213 A1* | 7/2005 | Guzak et al. | 700/94 |
| 2005/0207726 A1* | 9/2005 | Chen | 386/46 |
| 2005/0240705 A1* | 10/2005 | Novotney et al. | 710/303 |
| 2005/0246375 A1* | 11/2005 | Manders et al. | 707/104.1 |
| 2006/0015826 A1* | 1/2006 | Shiozawa et al. | 715/864 |
| 2006/0031545 A1* | 2/2006 | Manders et al. | 709/230 |
| 2006/0116009 A1* | 6/2006 | Langberg et al. | 439/76.1 |
| 2006/0143680 A1* | 6/2006 | Adachi | 725/134 |
| 2006/0161621 A1* | 7/2006 | Rosenberg | 709/204 |
| 2006/0163358 A1* | 7/2006 | Biderman | 235/472.01 |
| 2006/0236245 A1* | 10/2006 | Agarwal et al. | 715/716 |
| 2006/0294209 A1* | 12/2006 | Rosenbloom et al. | 709/220 |
| 2007/0056013 A1* | 3/2007 | Duncan | 725/134 |
| 2007/0236482 A1* | 10/2007 | Proctor et al. | 345/204 |
| 2007/0300155 A1* | 12/2007 | Laefer et al. | 715/700 |
| 2008/0055272 A1* | 3/2008 | Anzures et al. | 345/173 |
| 2008/0065722 A1* | 3/2008 | Brodersen et al. | 709/203 |
| 2010/0106879 A1* | 4/2010 | Laefer et al. | 710/305 |

* cited by examiner

| Pin | Signal Name | I/O | Function |
|---|---|---|---|
| 1 | DGND | I | Digital Ground |
| 2 | DGND | I | Digital Ground |
| 3 | TPA+ | I/O | Firewire signal |
| 4 | USB D+ | I/O | USB signal |
| 5 | TPA- | I/O | Firewire signal |
| 6 | USB D- | I/O | USB signal |
| 7 | TPB+ | I/O | Firewire signal |
| 8 | USB PWR | I | USB power is NOT for powering; only to detect USB host |
| 9 | TPB- | I/O | Firewire signal |
| 10 | Accessory Identify | I | Pull down in dock to notify iPod of specific device |
| 11 | F/W PWR+ | I | Firewire and charger input power (8V to 30V dc) |
| 12 | F/W PWR+ | I | Firewire and charger input power (8V to 30V dc) |
| 13 | ACCESSORY PWR(3V3) | O | 3.3V output from iPod. Current limited to 100mA |
| 14 | Reserved | | |
| 15 | DGND | GND | Digital ground in iPod |
| 16 | DGND | GND | Digital ground in iPod |
| 17 | Reserved | | |
| 18 | Dock Tx | I | Serial protocol (Data to iPod) |
| 19 | Dock Rx | O | Serial protocol (Data from iPod) |
| 20 | Accessory Detect | I/O | |
| 21 | S Video Y | O | Luminance Component |
| 22 | S Video C | O | Chrominance Component |
| 23 | Video Composite | O | Composite Signal |
| 24 | Remote Sense | I | Detect Remote |
| 25 | LINE-IN L | I | Line level input to the iPod for the left channel |
| 26 | LINE-IN R | I | Line level input to the iPod for the right channel |
| 27 | LINE-OUT L | O | Line level output to the iPod for the left channel |
| 28 | LINE-OUT R | O | Line level output to the iPod for the right channel |
| 29 | Audio Return | GND | Audio return - Signal, never to be grounded inside accessory |
| 30 | DGND | GND | Digital ground iPod |
| 31 | Chassis | | Chassis ground for connector shell |
| 32 | Chassis | | Chassis ground for connector shell |

FIG. 4A

| Pin | Signal Name | I/O | Function |
|---|---|---|---|
| 1 | Audio. Out Left / Mono Mic In | I/O | 30mW audio out left channel, also doubles as mono mic in |
| 2 | HP Detect | I | Internal Switch to detect plug insertion |
| 3 | Audio Return | GND | Audio return for left and right audio |
| 4 | Audio Out Right | O | 30mW audio out right channel |
| 5 | Composite Video | O | Video Signal |
| 6 | Accessory 3.3 V | O | 3.3V Accessory power 100mA max |
| 7 | Tx | O | Serial protocol (Data from iPod to Device) |
| 8 | Rx | I | Serial protocol (Data from iPod from Device) |
| 9 | D GND | GND | Digital ground for accessory |

METHOD AND SYSTEM FOR CONTROLLING VIDEO SELECTION AND PLAYBACK IN A PORTABLE MEDIA PLAYER

CROSS-REFERENCES TO RELATED APPLICATIONS

This application is a continuation of, and claims priority to, U.S. patent application Ser. No. 11/519,541 entitled "Method And System For Controlling Video Selection And Playback In A Portable Media Player", filed on Sep. 11, 2006, now issued as U.S. Pat. No. 7,673,083 on Mar. 2, 2010, the contents of which are incorporated by reference herein in their entirety for all purposes.

This application is related to U.S. patent application Ser. No. 10/833,689, now U.S. Pat. No. 7,441,062, entitled "Connector Interface System for a Multi-Communication Device", filed on Apr. 27, 2004, and assigned to the assignee of the present application, which is incorporated by reference herein.

This application is related to U.S. patent application Ser. No. 11/519,386, entitled "Method and System for Controlling an Accessory Having a Tuner", now U.S. Pat. No. 7,441,058, filed on Sep. 11, 2006, assigned to the assignee of the present application which is incorporated by reference herein.

This application is related to U.S. patent application Ser. No. 11/519,278, now U.S. Pat. No. 7,558,894, entitled "Method and System for Controlling Power Provided to an Accessory", filed on Sep. 11, 2006, assigned to the assignee of the present application which is incorporated by reference herein.

FIELD OF THE INVENTION

The present invention relates generally to electrical devices and more particularly to electrical devices such as portable media players that communicate with accessory devices.

BACKGROUND OF THE INVENTION

A portable media player stores media assets, such as audio tracks, video tracks or photos that can be played or displayed on the portable media player. One example of a portable media player is the iPod® portable media player, which is available from Apple Inc. of Cupertino, Calif. Often, a portable media player acquires its media assets from a host computer that serves to enable a user to manage media assets. As an example, the host computer can execute a media management application to manage media assets. One example of a media management application is iTunes®, version 6.0, produced by Apple Inc.

A portable media player typically includes one or more connectors or ports that can be used to interface to the portable media player. For example, the connector or port can enable the portable media player to couple to a host computer, be inserted into a docking system, or receive an accessory device. There are today many different types of accessory devices that can interconnect to the portable media player. For example, a remote control can be connected to the connector or port to allow the user to remotely control the portable media player. As another example, an automobile can include a connector and the portable media player can be inserted onto the connector such that an automobile media system can interact with the portable media player, thereby allowing the media content on the portable media player to be played within the automobile. In another example, a digital camera can be connected to the portable media player to download images and the like. In another example, content (either audio, video or photos) can be provided from a host to the portable media player which can then play the content.

Accordingly, it is desirable for the portable media player to be able to effectively provide ways to optimize the interaction between a portable media player and an accessory. The present invention addresses such a need.

SUMMARY OF THE INVENTION

A method and system for controlling video selection and playback is disclosed. In a first aspect, a method and system for providing video settings for a portable media player comprise obtaining preferences of the portable media player; returning a current setting of the portable media player and setting appropriate preferences within the portable media player. The method and system includes enabling the preferences of the portable media player.

In a second aspect, a method and system for use with a portable media player comprise providing an audio menu and a video menu via the portable media player and selecting the video menu. The method and system includes selecting the video capable tracks of the portable media player utilizing a command.

In a third aspect, a method and system for navigating a video control within a portable media player comprise providing a video hierarchy and selecting a media kind from the video hierarchy utilizing at least one command. The method and system includes selecting a category of the media kind until a desired video track is obtained utilizing at least one command.

DETAILED DESCRIPTION OF THE INVENTION

The present invention relates generally to electrical devices and more particularly to electrical devices such as portable media players that communicate with accessory devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A method and system in accordance with the present invention provides a system that allows a portable media player to control settings of portable media player when receiving video from an accessory, to control playback of the portable media player and to provide for navigation between video tracks in a hierarchical fashion. In so doing, a portable media player can then utilize this information to allow for the maximum functionality of the accessory when connected to the portable media player. In one embodiment commands are utilized to facilitate communication of this information between the portable media player and the accessory. To describe the features of the present invention in more detail refer now to the following discussion in conjunction with the companying Figures.

Figure 1:
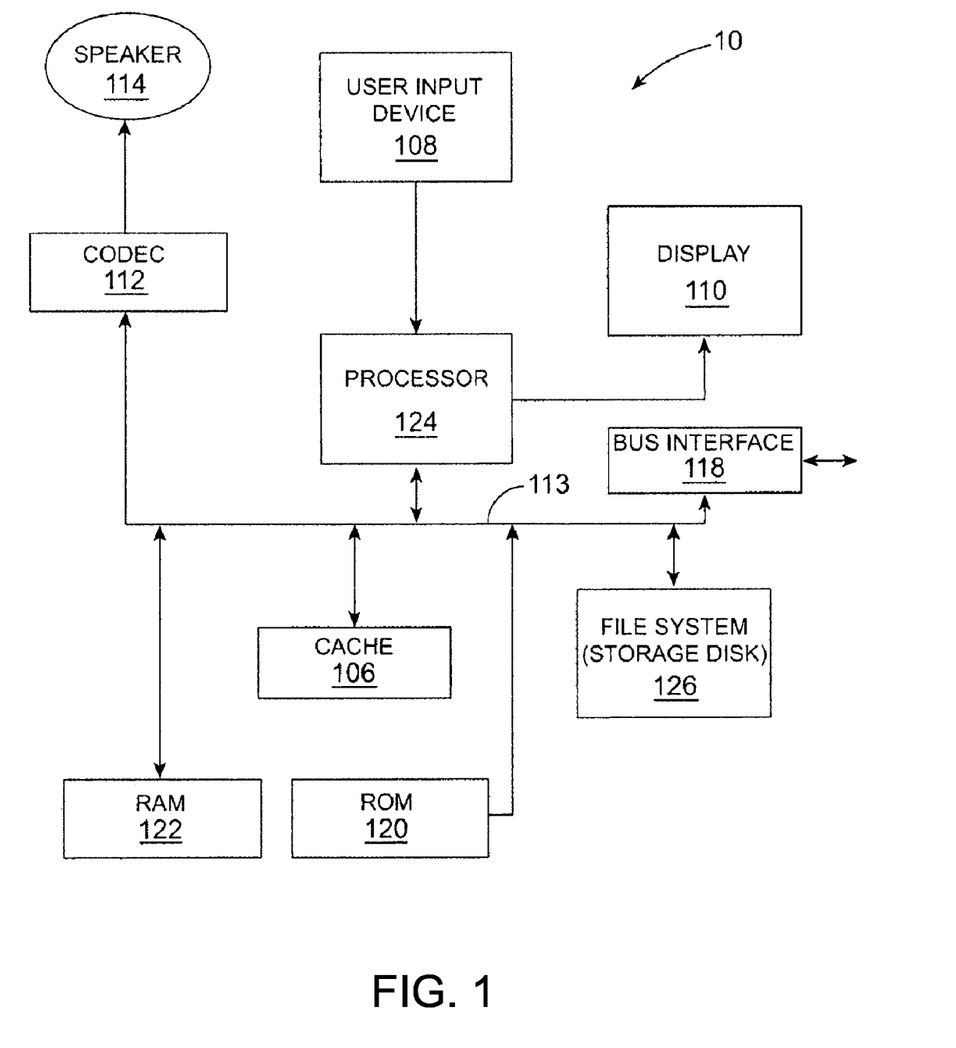
FIG. 1 shows an exemplary portable media player, in accordance with an embodiment of the invention.

FIG. 1 shows a simplified block diagram for an exemplary portable media player 10 in accordance with an embodiment of the invention. The portable media player 10 includes a processor 124 that pertains to a microprocessor or controller for controlling the overall operation of the portable media player 10. The portable media player 10 stores media data pertaining to media assets in a file system 126 and a cache 106. The file system 126 typically provides high capacity storage capability for the portable media player 10. However, to improve access time to the file system 126, the portable media player 10 can also include a cache 106. The cache 106 may be, for example, Random-Access memory (RAM). The relative access time to the cache 106 is substantially shorter than for the file system 126. However, the cache 106 typically does not have the large storage capacity of the file system 126. Further, the file system 126, when active, consumes more power than does the cache 106. The power consumption is particularly important when the portable media player 10 is powered by a battery (not shown). The portable media player 10 also includes additional RAM 122 and a Read-Only Memory (ROM) 120. The ROM 120 can store programs to be executed by the processor 124. The RAM 122 provides volatile data storage, such as for the cache 106.

The portable media player 10 also includes a user input device 108 that allows a user of the portable media player 10 to interact with the portable media player 10. For example, the user input device 108 can take a variety of forms, such as a button, keypad, touch screen, dial, etc. Still further, the portable media player 10 includes a display 110 (screen display) that can be controlled by the processor 124 to display information as well as photos and video tracks to the user. A data bus 113 can facilitate data transfer between at least the file system 126, the cache 106, the processor 124, and other functional blocks. The portable media player 10 also includes a bus interface 116 that couples to a data link 118. The data link 118 allows the portable media player 10 to couple to a host computer that can be a stand alone host computer or part of an interconnected network of computers, such as the Internet or other such distributed systems.

In one embodiment, the portable media player 10 serves to store a plurality of media assets (e.g., songs, videos, photos) in the file system 126. When a user desires to have the portable media player 10 play a particular media item, a list of available media assets is displayed on the display 110. Then, using the user input device 108, a user can select one of the available media assets. The processor 124, upon receiving a selection of a particular media item, such as an audio file, supplies the media data for the particular media item to a coder/decoder (CODEC) 112 via bus 113. The CODEC 112 then produces analog output signals for a speaker 114. The speaker 114 can be a speaker internal to the portable media player 10 or external to the portable media player 10. For example, headphones or earphones that connect to the portable media player 10 would be considered an external speaker. In other applications, media asset files stored on the host computer or in other computers coupled to the host computer by way of the network can be transferred (otherwise referred to as downloaded) to the file system 126 (or the cache 106). These media assets could also be, for example, videos or photos which could be provided to the display 110 via a video processor (not shown) either coupled to or within the processor 124. In this way, the user has available any number and type of media asset files for play by the portable media player 10.

For example, in a particular embodiment, the available media assets are arranged in a hierarchical manner based upon a selected number and type of groupings appropriate to the available media assets. In the case where the portable media player 10 is an MP3 type media player, the available media assets take the form of MP3 files (each of which corresponds to a digitally encoded song or other rendition) stored at least in part in the file system 126. The available media assets (or in this case, songs) can be grouped in any manner deemed appropriate. In one arrangement, the songs can be arranged hierarchically as a list of music genres at a first level, a list of artists associated with each genre at a second level, a list of albums for each artist listed in the second level at a third level, a list of songs for each album listed in the third level at a fourth level, and so on.

A method and system in accordance with the present invention can be utilized with a portable media player and its associated accessory in a variety of environments. One such environment is within a connector interface system that is described in detail herein below. The connector interface system allows for the portable media player and the accessory to communicate utilizing interface signals over at least one of the pins of the connector interface system.

Connector Interface System Overview

To describe the features of the connector interface system in accordance with the present invention in more detail, refer now to the following description in conjunction with the accompanying drawings.

Docking Connector

Figure 2A:
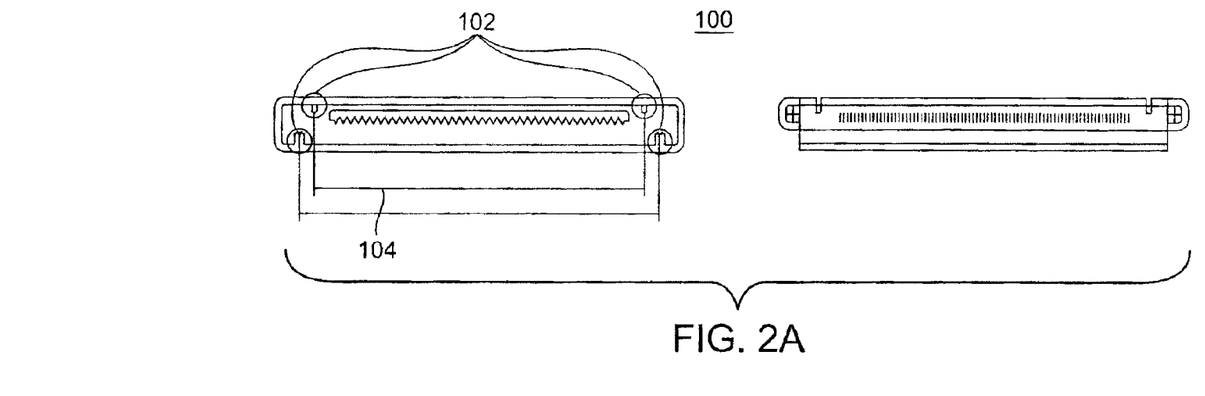
FIGS. 2A and 2B illustrate a docking connector in accordance with the present invention.
Figure 2B:
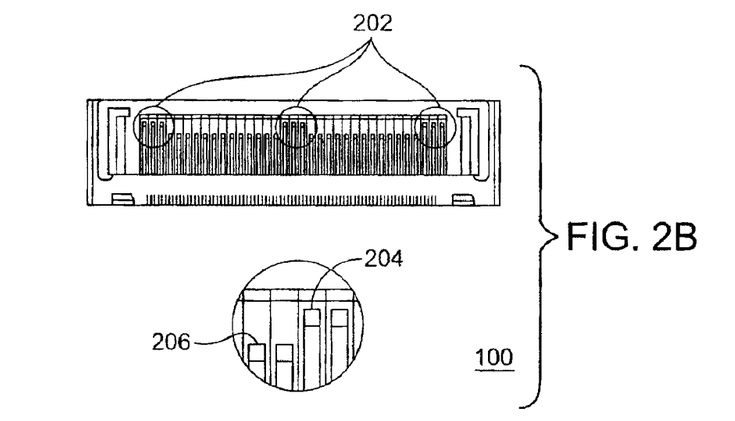

FIGS. 2A and 2B illustrate a docking connector 100 in accordance with the present invention. Referring first to FIG. 2A, the keying features 102 are of a custom length 104. In addition, a specific key arrangement is used, where one set of keys separated by one length are at the bottom and another set of keys separated by another length are at the top of the connector. The use of this key arrangement prevents noncompliant connectors from being plugged in and potentially causing damage to the device. The connector for power utilizes a Firewire specification for power. The connector includes a first make/last break contact to implement this scheme. FIG. 2B illustrates the first make/last break contact 202 and also illustrates a ground pin 204 and a power pin 206 related to providing an appropriate first make/last break contact. In this example, the ground pin 204 is longer than the power pin 206. Therefore, the ground pin 204 would contact its mating pin in the docking accessory before the power pin 206. Therefore the risk of internal electrical damage to the electronics of the device is minimized. Further details of an exemplary embodiment for the docking connector 100 are described in U.S. Pat. No. 6,776,660 entitled CONNECTOR, which issued on Aug. 17, 2004 and is incorporated herein by reference in its entirety.

In addition, a connector interface system in accordance with the present invention uses both USB and Firewire interfaces as part of the same docking connector alignment, thereby making the design more compatible with different types of interfaces, as will be discussed in detail hereinafter. In so doing, more remote accessories can interface with the portable media player.

Remote Connector

Figure 3A:
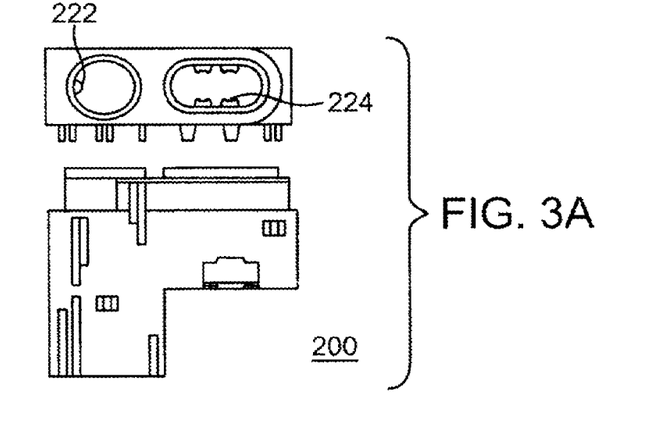
FIG. 3A is a front and top view of a remote connector in accordance with the present invention.
Figure 3B:
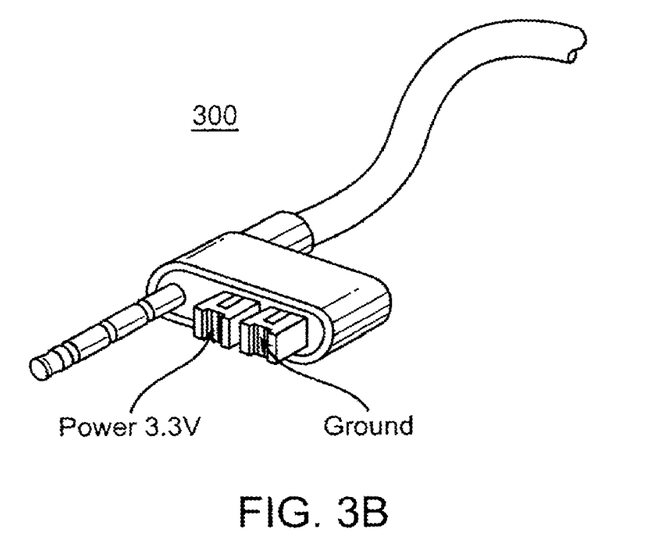
FIG. 3B illustrates a plug to be utilized in the remote connector.
Figure 3C:
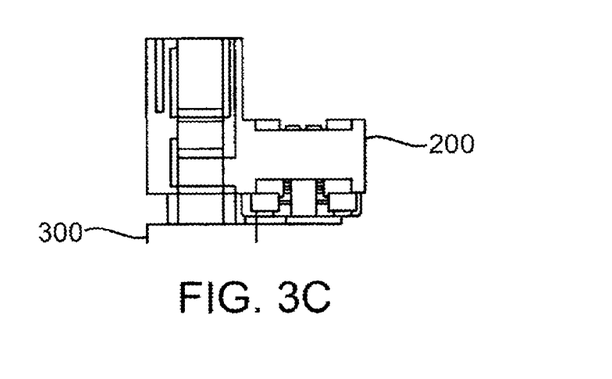
FIG. 3C illustrates the plug inserted into the remote connector.

The connector interface system also includes a remote connector which provides for the ability to output audio and input audio, provides I/O serial protocol, and provides the ability to input video and output video. FIG. 3A is a front and top view of a remote connector 200 in accordance with the present invention. As is seen, the remote connector 200 includes a top headphone receptacle 222, as well as a second receptacle 224 for remote devices. FIG. 3B illustrates a plug 300 to be utilized in the remote connector. The plug 300 allows these features to be provided via the remote connector. FIG. 3C illustrates the plug 300 inserted into the remote connector 200. Heretofore, all these features have not been implemented in a remote connector. Therefore, a standard headphone cable can be plugged in but also special remote control cables, microphone cables and video cables could be utilized with the remote connector.

To describe the features of the connector interface system in more detail, provided below is a functional description of the docking connector, remote connector and a command set in accordance with the present invention.

Docking and Remote Connector Specifications

Figure 4A:
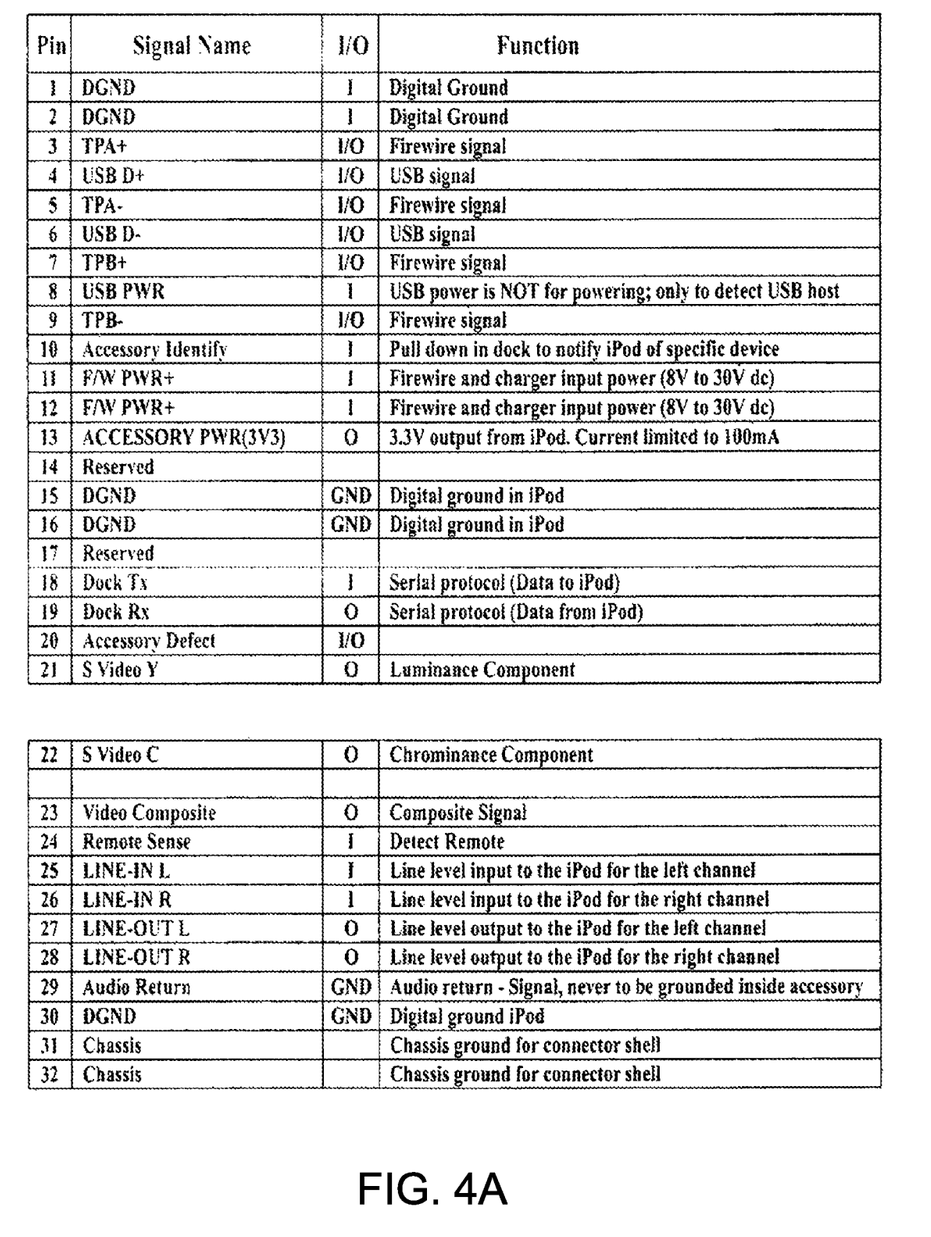
FIG. 4A illustrates the connector pin designations for the docking connector.
Figure 4B:
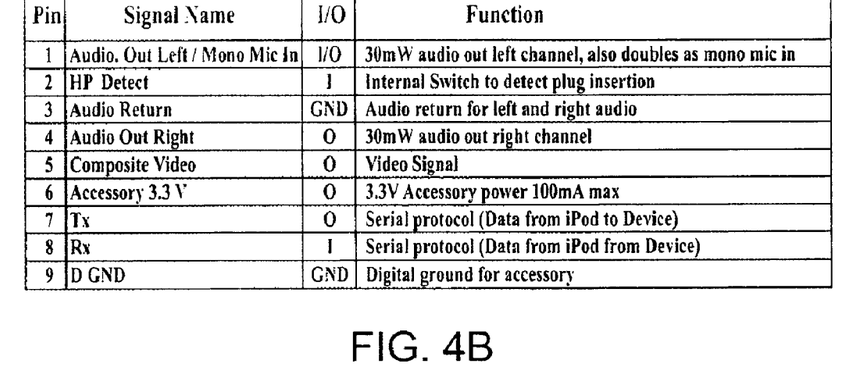
FIG. 4B illustrates the connection pin designations for the remote connector.

For an example of the connector pin designations for both the docking connector and for the remote connector for a portable media player such as an iPod device by Apple Inc., refer now to FIGS. 4A and 4B. FIG. 4A illustrates the connector pin designations for the docking connector. FIG. 4B illustrates the connection pin designations for the remote connector.

Docking Connector Specifications

Figure 5A:
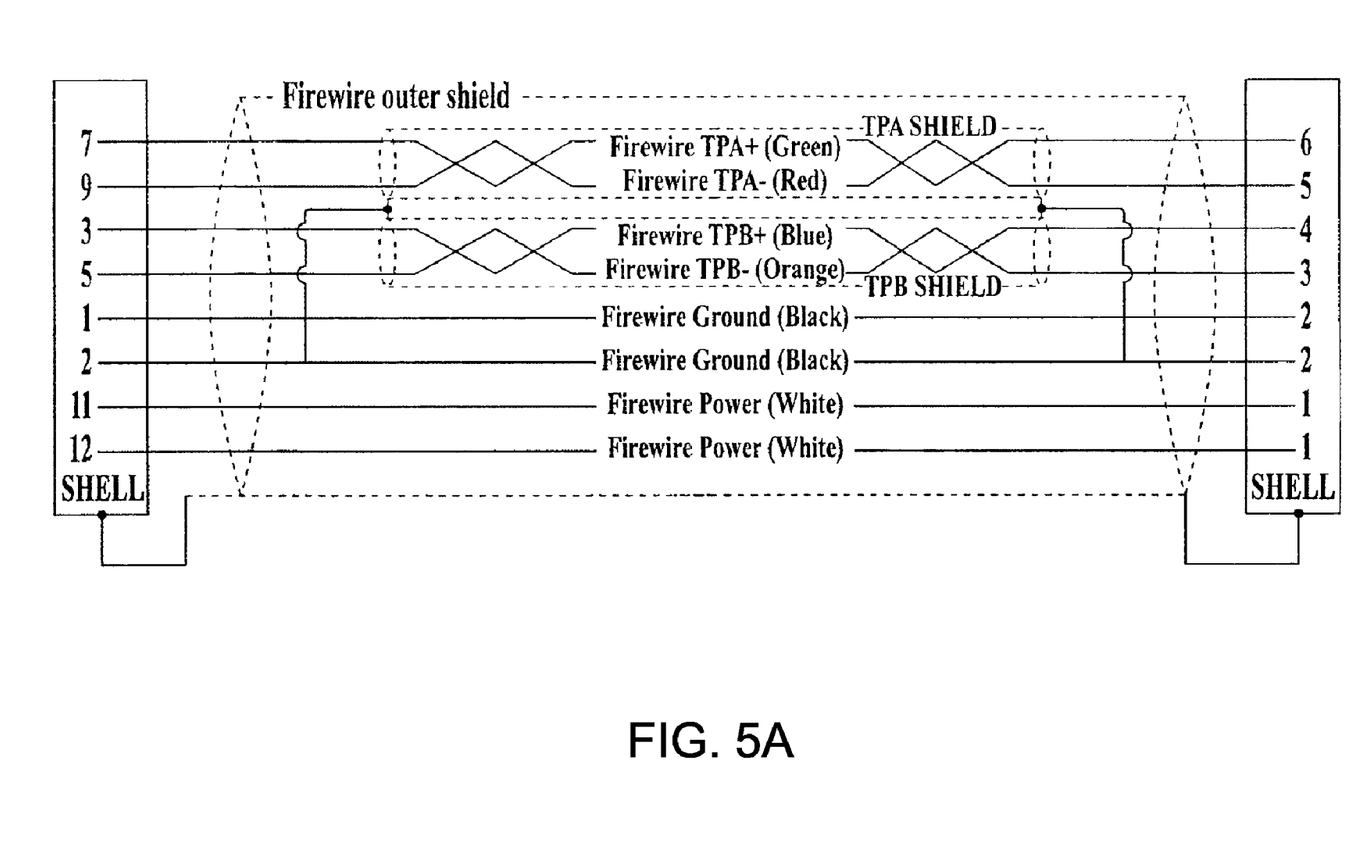
FIG. 5A illustrates a typical FireWire connector interface for the docking connector.

FIG. 5A illustrates a typical Firewire connector interface for the docking connector:

Firewire Power:
a) 8V-30V DC IN
b) 10 W Max

Firewire Signal:
a) Designed to IEEE 1394 A Spec (400 Mb/s)

USB Interface

In one embodiment, the portable media player provides two configurations, or modes, of USB device operation: mass storage and portable media player USB INTERFACE (MPUI). The MPUI allows the portable media player to be controlled using an accessory protocol. What is meant by an accessory protocol is the software component of the media player that communicates with accessories over a given transport layer.

Accessory Power

Figure 5B:
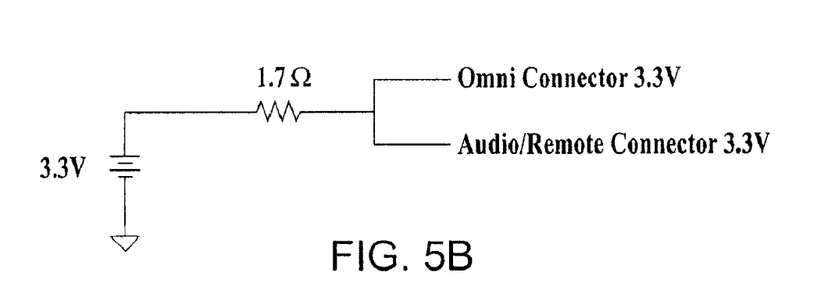
FIG. 5B illustrates a reference schematic diagram for an accessory power source.

FIG. 5B illustrates the accessory power source. The portable media player accessory power pin supplies voltages, for example, 3.0 V to 3.3V±5% (2.85 V to 3.465 V) over the docking connector and remote connector (if present). A maximum current is shared between the docking connector and the remote connector.

By default, the portable media player supplies a particular current such as 5 mA. An appropriate software accessory detection system can be employed to turn on high power (for example, up to 100 mA) during active device usage. When devices are inactive, they typically consume less than a predetermined amount of power such as 5 mA current.

Accessory power is switched off for a period of, for example, approximately 2 seconds during the powering up of the portable media player. This is done to ensure that accessories are in a known state and can be properly detected. In one embodiment, accessories are responsible for re-identifying themselves after the portable media player transitions accessory power from the off to the on state.

Accessory power is grounded through the Digital Ground (DGND) pins.

Figure 5C:
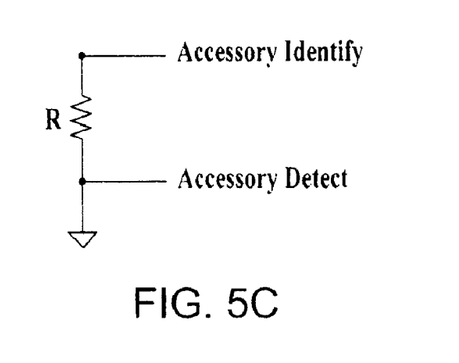
FIG. 5C illustrates a reference schematic diagram for a system for detecting and identifying accessories for the docking connector.

FIG. 5C illustrates a reference schematic diagram for a system for detecting and identifying accessories for the docking connector. The system comprises:

a) a resistor (R) to ground that allows the device to determine what type of accessory has been plugged into the docking connector; and b) two identify and detect pins (Accessory Identify (pin 10, FIG. 4A) and Accessory Detect (pin 20, FIG. 4A)).

Figure 5D:
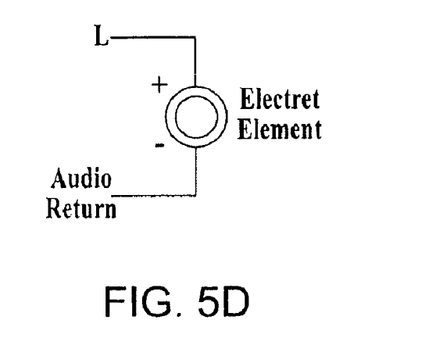
FIG. 5D is a reference schematic of an electric microphone that may be within the remote connector.

FIG. 5D is a reference schematic of an electret microphone that is within the remote connector.

Serial Protocol Communication:

For serial protocol communication, two pins are used to communicate to and from the device (Rx (pin 19, FIG. 4A) & Tx (pin 18, FIG. 4A)). Input & Output levels can be, e.g., 0V=Low, 3.3V=High.

Figure 6A:
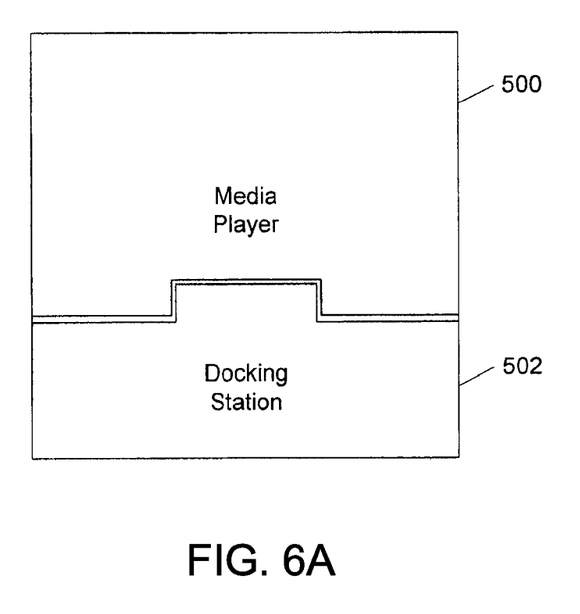
FIG. 6A illustrates a portable media player coupled to a docking station.
Figure 6B:
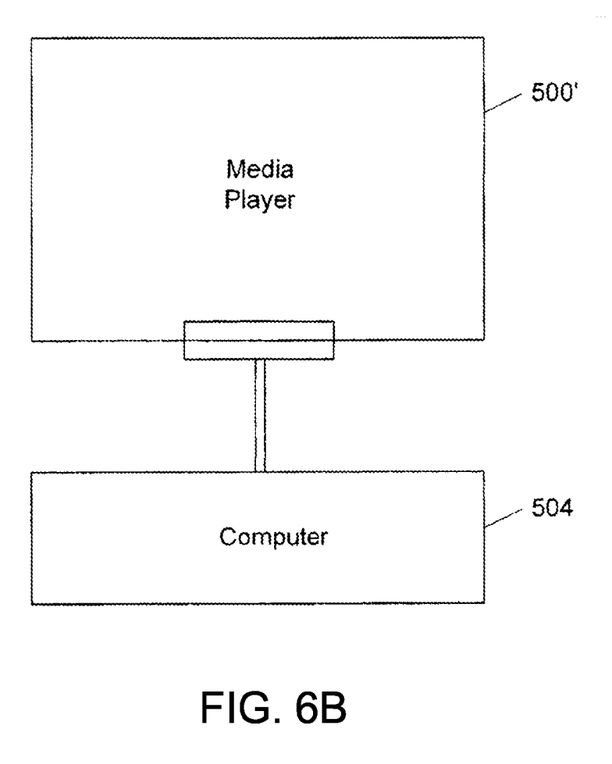
FIG. 6B illustrates the portable media player coupled to a computer.
Figure 6C:
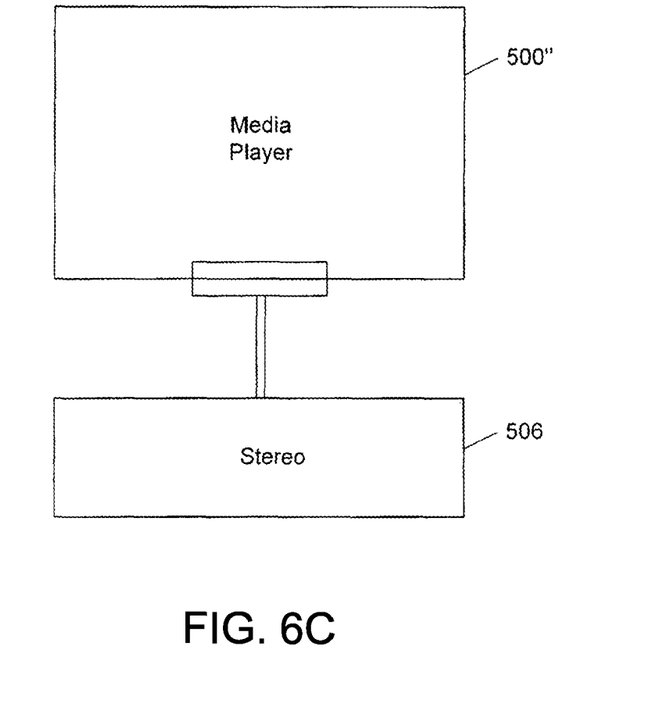
FIG. 6C illustrates the portable media player coupled to a car or home stereo system.
Figure 6D:
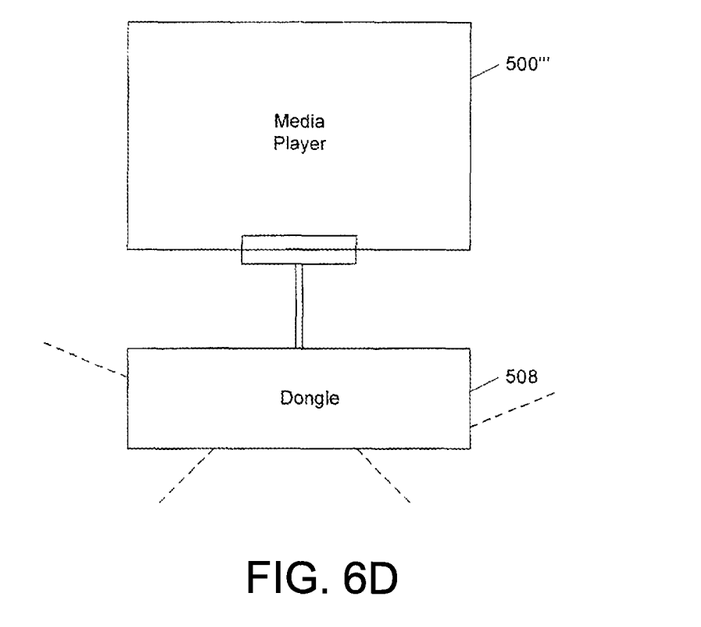
FIG. 6D illustrates the portable media player coupled to a dongle that communicates wirelessly with other accessories.
Figure 6E:
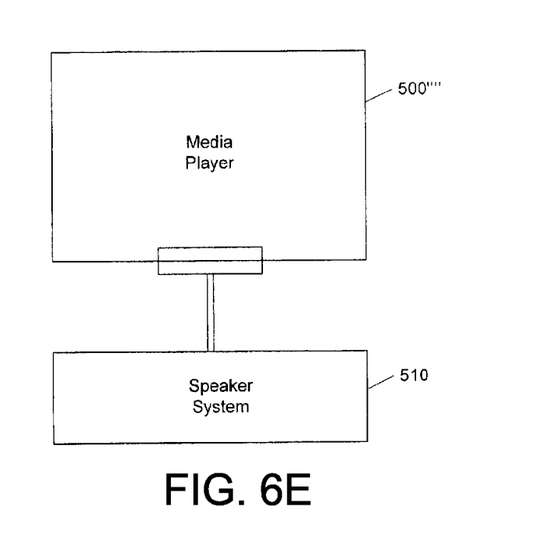
FIG. 6E illustrates the portable media player coupled to a speaker system.

As before mentioned, portable media players connect to a variety of accessories. FIGS. 6A-6E illustrates a portable media player coupled to different accessories. FIG. 6A illustrates a portable media player 500 coupled to a docking station 502. FIG. 6B illustrates the portable media player 500' coupled to a computer 504. FIG. 6C illustrates the portable media player 500" coupled to a car or home stereo system 506. FIG. 6D illustrates the portable media player 500''' coupled to a dongle 508 that communicates wirelessly with other devices. FIG. 6E illustrates the portable media player 500'''' coupled to a speaker system 510. As is seen, what is meant by accessories includes but is not limited to docking stations, chargers, car stereos, microphones, home stereos, computers, speakers, and accessories which communicate wirelessly with other accessories.

An embodiment can utilize a plurality of aspects to effectively play video information on a portable media player. First, the portable media player settings can be controlled. For example, the video output is set, the format used in the portable media player is set or the aspect ratio of the screen can be set. In a second aspect, playback controls are utilized to control the playing of a video. Finally, in a third aspect database navigation of the video selections is provided via a hierarchical system. To describe the features of each of these aspects in more detail refer now to the following discussion in conjunction with the accompanying drawings.

In one embodiment, commands are for accessories that need to control the state of the portable media player, recreate a portion of the portable media player user interface on a remote display, or control the state of the portable media player equalizer. The commands can be used by simple inline-display remotes (remotes that have single-line display and play control buttons) and more complex accessories that have full multi-line graphical displays to show information about the track, artist, or album; current play or pause state; track position; battery; shuffle and time.

Portable Media Player Settings

In one aspect, commands are utilized on a portable media player for video control. The commands for example could be provided via the serial pins (Rx and Tx) of the 30-pin connector shown in FIG. 4A.

Figure 7:
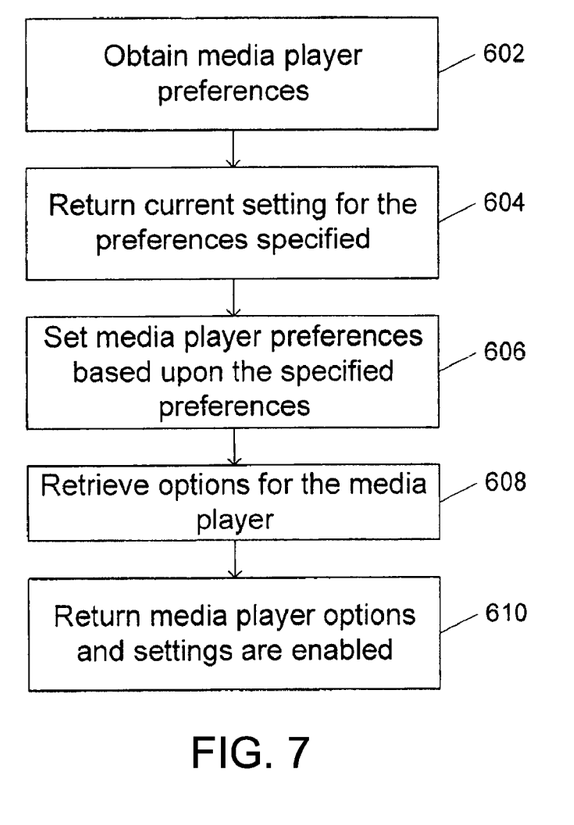
FIG. 7 is a flow chart that illustrates a process for providing the portable media player settings.

FIG. 7 is a flow chart that illustrates a process for providing the portable media player settings. First a command is provided which obtains portable media player preferences, via step 602. In one embodiment there are three values that may be set in the command: off (0), on (1) and "ask" (2). There may be several different preferences for video, for example, screen configuration and video format. In one embodiment there are two values for screen configuration: fullscreen (0) and widescreen (1). In one embodiment, there are two values for the video format, such as: an analog television format by the National Television System Committee (NTSC)(0) and Phase Alternating Line format (PAL) (1).

Next, a command returns the current setting for the preferences specified, via step 604. Thereafter, a command sets appropriate combinations of preference type and values, via step 606. Then a command is utilized to ask the portable media player to retrieve options supported by the portable media player, via step 608. Finally, the portable media player options are returned and the settings on the portable media player are enabled, via step 610. In so doing, video content can be controlled and played.

Video Selection and Playback

Figure 8:
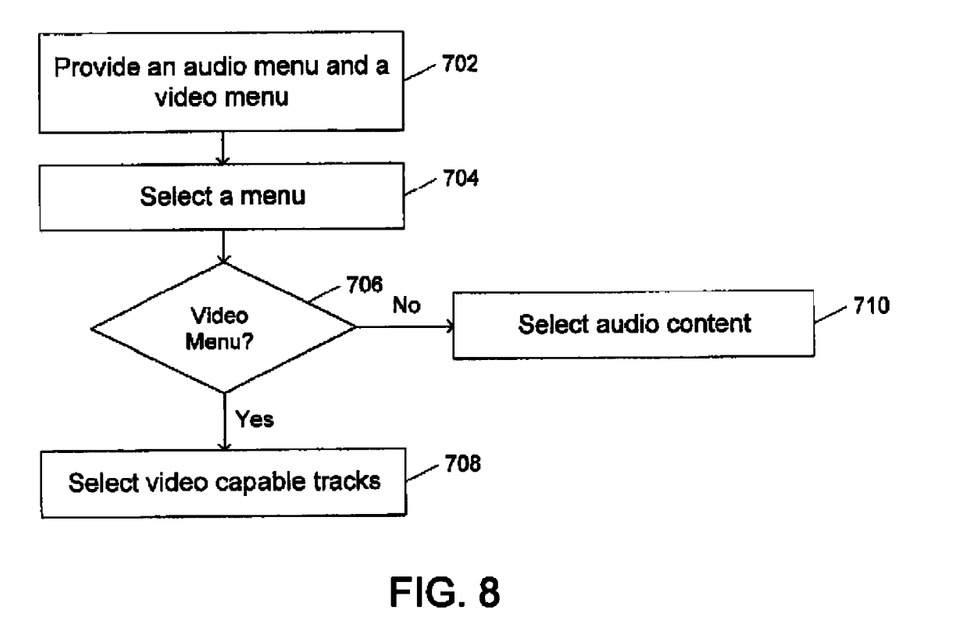
FIG. 8 is a flow chart that illustrates a process for selecting a menu from a portable media player.

Once the settings are enabled, then in a second aspect, video selection and playback is provided. In an embodiment, playing a video will depend on the current user selection. FIG. 8 is a flow chart illustrating a process for selecting a menu from a portable media player. Accordingly, audio and video menus are displayed, via step 702. If the user selects the video menu, then video will be played for video-capable tracks, via step 704. If the user selects the audio menu, then only audio will be played, via step 706.

Database Navigation

Figure 9:
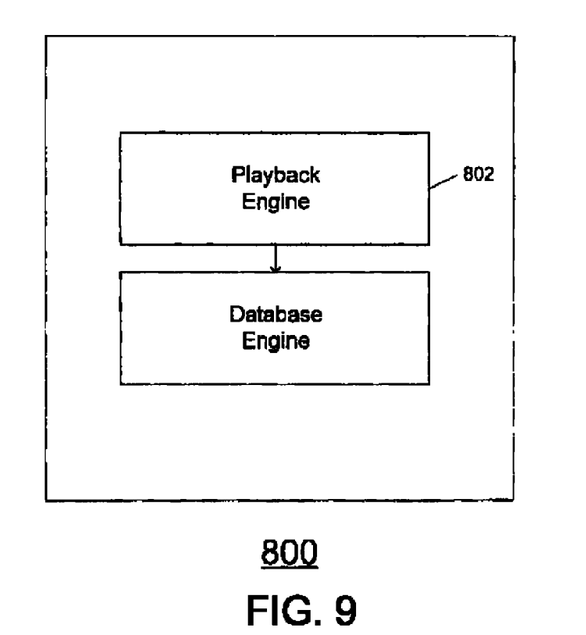
FIG. 9 is a block diagram that illustrates two logical entities in a portable media player that need to be managed while browsing and playing content: a playback and a database engine.

In a third aspect, the database of the portable media player must be navigated to play the appropriate video selection. To describe this feature in more detail, refer now to the following description in conjunction with the accompanying figures. As shown in FIG. 9, in a portable media player 800 there are two logical entities that need to be managed while browsing and playing content: a playback engine 802 and a database engine 804. The following describes those engines and gives an example of command traffic between an accessory and a portable media player.

The Playback Engine

The playback engine 802 is active when the portable media player is in a playback state, such as play, fast forward, and rewind. It has a special play list that is used to determine what track or content item will be played next. A command is used to transfer the currently selected database items to the special play list and start the portable media player at a specified item within that list.

The Database Engine

The database engine 804 can be manipulated remotely and allows groups of content items to be selected, independently of the playback engine 802. This allows the user to listen to an existing track or playlist while checking the portable media player database for another selection. Once a different database selection is made, the user selection (the track or content playlist) is sent to the playback engine 802.

Database Category Hierarchies

The database engine 804 uses categories to classify records stored in the database. Possible categories are playlist, genre, artist, album, track, composer and audiobook. A list of records can be assembled, based on the various selected categories, to create a user list of records (a playlist).

In one embodiment, the database categories have a hierarchy by which records are sorted and retrieved. This category hierarchy has an impact on the order in which records should be selected. For example, if a low category, such as album, is selected first, followed by a higher relative category such as genre, the album selection is invalidated and is ignored. When creating a new set of database selections, the accessory should begin by resetting all database selections, using the a command, and selecting the desired database categories from highest to lowest relative category.

Figure 10:
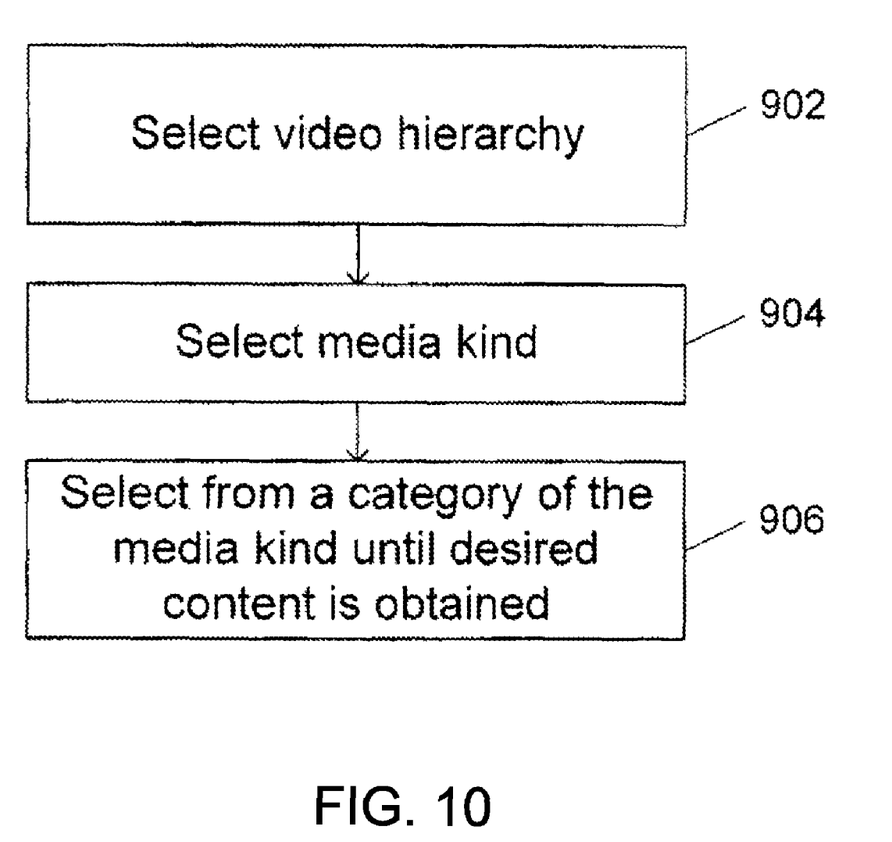
FIG. 10 is a flow chart that illustrates database navigation in a portable media player.

FIG. 10 is a flow chart illustrating database navigation in a portable media player in accordance with the present invention. In an embodiment, a command is utilized to select between audio and video hierarchies via step 902. For example, an additional byte can be added to the command to select the hierarchy. In the video hierarchy, a "genre" list of an audio track selection will be used to indicate a "media kind" list of the video track selection, via step 904. As with the genre list, the media kind list is dynamic and may be updated to add, modify, or remove existing entries.

Once a media kind has been selected, next the existing categories, such as "Artist", "Album", and "Song/Track" are then used to further narrow the selection until the desired content is found, via step 904. Next it is determined if the categories selected return a single entry, via step 906. If the categories selected provides multiple entries, then one of the entries must be selected. For example, for a television show if there are several seasons, then one of the seasons must be selected. For some media kinds (e.g., movies), the categories will return a single entry and the accessory can, for example, provide a shortcut to a next level down. Similarly, for television shows, the Season menu may be omitted on the portable media player if all the episodes are from a single season. Video podcasts operate just like television shows. Music videos are also like television shows except that they do not currently use album names. In one embodiment, when browsing through the music hierarchy, video-only tracks will be filtered out. Hybrid tracks (like video podcasts) can appear in both hierarchies.

A method and system in accordance with the present invention provides a system that allows a portable media player to control settings of portable media player when receiving video from an accessory, to control playback of the portable media player and to provide for navigation between video tracks in a hierarchical fashion. In so doing, a portable media player can then utilize this information to provide for the maximum functionality of the accessory when connected to the portable media player.

Although the present invention has been described in accordance with the embodiments shown, one of ordinary skill in the art will readily recognize that there could be variations to the embodiments and those variations would be within the spirit and scope of the present invention. For example, the present invention can be implemented using hardware, software, a computer readable medium containing program instructions, or a combination thereof. Software written according to the present invention is to be either stored in some form of computer-readable medium such as a memory or CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

What is claimed is:

1. A connector interface system for a portable media player, the connector interface system comprising:
    an interface capable of communicating video settings with an accessory using a plurality of commands, the plurality of commands including:
    a first command receivable by the portable media player, the first command requesting a video preference of the portable media player;
    a second command sendable by the portable media player, the second command communicating a current setting of the video preference to the accessory, the second command being sent in response to the first command;
    a third command sendable by the portable media player, the third command including video preferences supported by the portable media player to the accessory; and
    a fourth command receivable by the portable media player, the fourth command including a new setting for the video preference, selected from among the video preferences supported by the portable media player, thereby changing the video preference of the portable media player, the fourth command being received in response to the third command.

2. The connector interface system of claim 1 wherein the interface comprises a wireless interface.

3. The connector interface system of claim 1 wherein the interface includes a plurality of signal contacts coupled to the interface, wherein the plurality of signal contacts includes a plurality of serial pins and wherein the video preferences are controlled by communicating the plurality of commands with the accessory via the serial pins.

4. The connector interface system of claim 1 wherein the interface includes a plurality of signal contacts coupled to the interface, wherein at least a portion of the signal contacts are utilized to communicate the plurality of commands.

5. The connector interface system of claim 4 wherein the plurality of signal contacts comprises a connector.

6. The connector interface system of claim 1 wherein the video preferences comprise a screen configuration preference and a video format preference, wherein there are values associated with each of the video preferences, wherein each value associated with a particular video preference indicates a particular format.

7. The connector interface system of claim 6 wherein the values associated with the screen configuration preference include a first value associated with a fullscreen format and a second value associated with a widescreen format.

8. The connector interface system of claim 6 wherein the values associated with the video format include a first value associated with an NTSC format and a second value associated with a PAL format.

9. A computer-readable storage medium storing a plurality of instructions, that when executed by a processor in a portable media player, cause the portable media player to perform a method for setting video preferences, the method comprising:
    receiving a first command from the accessory, the first command requesting a current video preference of the portable media player;
    sending a second command to the accessory, in response to the first command, the second command including a current setting of the video preference of the portable media player;
    sending a third command to the accessory; the third command including a listing of video options supported by the portable media player; and
    receiving a fourth command from the accessory, in response to the third command, the fourth command including a new setting for the current video preference of the portable media player;
    wherein the portable media player responds to the fourth command by setting the video preference to correspond to the new setting.

10. The computer readable storage medium of claim 9 wherein the video preferences comprise a screen configuration and a video format, wherein there are values associated with each of a plurality of video preferences, and wherein each value associated with a particular video preference indicates a particular format.

11. The computer readable storage medium of claim 10 wherein the values associated with a screen configuration video preference include a first value associated with a fullscreen format and a second value associated with a widescreen format.

12. The computer readable storage medium of claim 10 wherein the values associated with a video format video preference include a first value associated with an NTSC format and a second value associated with a PAL format.

13. A method for providing video settings for a portable media player, the method comprising, by the portable media player:
    receiving a first command from the accessory, the first command requesting a current video preference of the portable media player;
    sending a second command to the accessory in response to the first command, the second command including a current parameter value indicating the current video preference; and
    receiving a third command from the accessory in response to the second command, the third command including a new parameter value for the current video preference, wherein the portable media player responds to the third command by setting the video preference to correspond to the new parameter value.

14. The method of claim 13 wherein the current video preference is a screen configuration preference.

15. The method of claim 14 wherein the current parameter value and the new parameter value for the screen configuration preference are each selected from a group of values that includes at least:
    a first value corresponding to a widescreen configuration; and
    a second value corresponding to a fullscreen configuration.

16. The method of claim 13 wherein the current video preference is a video format preference.

17. The method of claim 16 wherein the current parameter value and the new parameter value for the video format preference are each selected from a group of values that includes at least:
   a first value corresponding to an NTSC format; and
   a second value corresponding to a PAL format.

18. The method of claim 13 further comprising:
   receiving a fourth command from the accessory, the fourth command requesting video options supported by the portable media player; and
   sending the supported video options to the accessory.

19. A portable media player for use with an accessory, the portable media player comprising:
   an interface adapted to be coupled with an accessory and capable of supporting an accessory protocol for exchanging with the accessory commands and information related to playback of video tracks stored on the portable media player; and
   a processor coupled to the interface, the processor being adapted to:
   receive a first command via the interface from the accessory, the first command requesting a current video preference of the portable media player;
   send a second command to the accessory via the interface, the second command being sent in response to the first command and including a current parameter value indicating the current video preference; and
   receive a third command from the accessory via the interface in response to the second command, the third command including a new parameter value for the current video preference, wherein the portable media player responds to the third command by setting the video preference to correspond to the new parameter value.

20. The portable media player of claim 19 wherein the interface comprises a connector having a plurality of signal pins, the signal pins being arranged to mate with corresponding signal pins on a mating connector of the accessory, wherein the plurality of signal pins includes a pair of serial pins and wherein the first command and the third command are received via a receive pin of the pair of serial pins.

21. The portable media player of claim 20 wherein the plurality of signal pins further includes:
   a ground pin and a power pin;
   an accessory identify signal pin;
   an accessory detect signal pin;
   a video output pin;
   a USB signal pin;
   a USB power pin;
   a Firewire signal pin; and
   a Firewire power pin.

22. The portable media player of claim 21 wherein the plurality of signal pins further includes an accessory power pin and a line signal pin.

23. The portable media player of claim 20 wherein the connector comprises:
   a keying arrangement including a first set of keys separated by a first length and a second set of keys separated by a different length.

24. The portable media player of claim 19 wherein the current video preference is a screen configuration preference and wherein the current parameter value and the new parameter value for the screen configuration preference are each selected from a group of values consisting of:
   a first value corresponding to a widescreen configuration; and
   a second value corresponding to a fullscreen configuration.

25. The portable media player of claim 19 wherein the current video preference is a video format preference and wherein the current parameter value and the new parameter value for the video format preference are each selected from a group of values consisting of:
   a first value corresponding to an NTSC format; and
   a second value corresponding to a PAL format.

26. The portable media player of claim 19 wherein the processor is further adapted to:
   receive a fourth command from the accessory, the fourth command requesting video options supported by the portable media player; and
   send the supported video options to the accessory.

* * * * *

UNITED STATES PATENT AND TRADEMARK OFFICE
CERTIFICATE OF CORRECTION

PATENT NO. : 7,908,415 B2
APPLICATION NO. : 12/684275
DATED : March 15, 2011
INVENTOR(S) : Jay S. Laefer et al.

Page 1 of 1

It is certified that error appears in the above-identified patent and that said Letters Patent is hereby corrected as shown below:

In column 6, line 6, delete "INTERFACE" and insert -- Interface --, therefor.

In column 8, line 27, delete "the a" and insert -- a --, therefor.

Signed and Sealed this
Twenty-second Day of November, 2011

David J. Kappos
*Director of the United States Patent and Trademark Office*